United States Patent
Uebori et al.

(10) Patent No.: US 10,618,641 B2
(45) Date of Patent: Apr. 14, 2020

(54) HELICOPTER ROTOR HEAD, MULTIROTOR HELICOPTER, AND HELICOPTER

(71) Applicant: AileLinX Inc., Fuchu-shi (JP)

(72) Inventors: Takakazu Uebori, Fuchu (JP); Shunichi Suzuki, Fuchu (JP)

(73) Assignees: Ailelinx Inc., Hiroshima (JP); Denso Corporation, Aichi (JP)

( * ) Notice: Subject to any disclaimer, the term of this patent is extended or adjusted under 35 U.S.C. 154(b) by 0 days.

(21) Appl. No.: 16/091,687

(22) PCT Filed: Oct. 3, 2016

(86) PCT No.: PCT/JP2016/079284
§ 371 (c)(1),
(2) Date: Oct. 5, 2018

(87) PCT Pub. No.: WO2017/175410
PCT Pub. Date: Oct. 12, 2017

(65) Prior Publication Data
US 2019/0161179 A1      May 30, 2019

(30) Foreign Application Priority Data

Apr. 7, 2016   (JP) ................................. 2016-077386

(51) Int. Cl.
| | |
|---|---|
| *B64C 27/08* | (2006.01) |
| *B64C 11/32* | (2006.01) |
| *B64C 27/59* | (2006.01) |
| *B64C 39/02* | (2006.01) |

(52) U.S. Cl.
CPC .............. *B64C 27/08* (2013.01); *B64C 11/32* (2013.01); *B64C 27/59* (2013.01); *B64C 39/02* (2013.01); *B64C 39/024* (2013.01)

(58) Field of Classification Search
CPC ....... B64C 27/08; B64C 27/20; B64C 27/605; B64C 39/024; B64C 27/59; B64C 39/02; B64C 11/32
See application file for complete search history.

(56) References Cited

U.S. PATENT DOCUMENTS 3,053,480 A * 9/1962 Vanderlip ............... B64C 27/54
                                                        244/17.13
2010/0196161 A1   8/2010 Uebori et al.

FOREIGN PATENT DOCUMENTS

| JP | 541594 U | 6/1993 |
|---|---|---|
| JP | 2014227016 A | 12/2014 |
| JP | 2014240214 A | 12/2014 |

(Continued)

*Primary Examiner* — Richard A Edgar
(74) *Attorney, Agent, or Firm* — The Webb Law Firm

(57) ABSTRACT

A variable pitch mechanism for a helicopter is configured to have a simple configuration with a small number of members, and to be capable of precisely controlling a pitch angle of blades without accurate adjustment. A pitch plate 16 and a pitch plate boss 17 are slidably mounted on an outer periphery of a main mast 61, and an output shaft of a servomotor 19 is directly connected to a pitch lever 18 that vertically moves the pitch plate boss 17. By actuating the servomotor 19 and rotating the pitch lever 18, the pitch plate boss 17 and the pitch plate 16 are displaced upward or downward along the main mast 61, thereby tilting blade holders 13, 13 connected to the pitch plate 16 and changing a pitch angle of the blades 14.

6 Claims, 6 Drawing Sheets

(56) References Cited

FOREIGN PATENT DOCUMENTS

| | | | |
|---|---|---|---|
| JP | 2014240242 | A | 12/2014 |
| JP | 3201100 | U | 10/2015 |
| WO | 2009004705 | A1 | 8/2009 |

\* cited by examiner

HELICOPTER ROTOR HEAD, MULTIROTOR HELICOPTER, AND HELICOPTER

CROSS-REFERENCE TO RELATED APPLICATIONS

This application is the United States national phase of International Application No. PCT/JP2016/079284 filed Oct. 3, 2016, and claims priority to Japanese Patent Application No. 2016-077386 filed Apr. 7, 2016, the disclosures of which are hereby incorporated in their entirety by reference.

TECHNICAL FIELD

The present invention relates to a structure of a rotor head for a single rotor helicopter or a multirotor helicopter (hereinafter, referred to as a "multicopter"). The present invention can be applied to an unmanned helicopter or a manned helicopter that flies by remote control or autonomous control.

BACKGROUND ART

A multicopter including three or more rotors has a simple mechanism and is easily manufactured compared to a single rotor helicopter, and is being utilized mainly in a field of aerial photographing, or investigation of seashores or craters where a person cannot enter, or in a field of collecting ground information from the sky such as information collection from the sky at the time of disaster, in place of the single rotor helicopter (for example, refer to Patent Literatures 1 and 2).

Such a multicopter is generally configured to fly by fixing the angles of blades, and controlling the rotational speed of a motor which drives each main rotor. However, a manned multicopter having a configuration in which the attack angle of a main rotor can be controlled such that landing is enabled by operation of autorotation when an engine or a motor which drives rotors is broken during flying is proposed (for example, refer to Patent Literature 3).

CITATION LIST

Patent Literature

Patent Literature 1: Japanese Patent Laid-Open No. 2014-227016
Patent Literature 2: Japanese Patent Laid-Open No. 2014-240242
Patent Literature 3: Japanese Utility Model Registration No. 3201100

SUMMARY OF INVENTION

Technical Problem

Conventionally, in a multicopter that flies by remote control, a fixed pitch for fixing the angle of blades is used, and therefore an occurrence rate of accidents, such as falls caused by collapse of a flight attitude during downward movement, and hunting falls caused by being out of control at the time of entering an updraft or receiving strong wind, is relatively high.

It is considered that the occurrence rate of such accidents can be reduced by employing a variable pitch mechanism that suitably controls the angle of blades. However, as in the above manned multicopter, when the variable pitch mechanism is configured by combining members such as an attack angle control module disposed above a main rotor, a gear box disposed at a lower section, linear servomotor, and a connecting shaft, the number of members is large, and therefore the weight of the airframe is increased, influence of "deflection" which is likely to occur in a link mechanism is received, and control accuracy is likely to be lower, so that accurate adjustment is required. Additionally, the mechanism is complicated, and therefore there is a problem that labor is required for assembly or maintenance of the airframe. In a case of a multicopter that has a complicated mechanism and cannot be easily manufactured, a merit for utilizing the multicopter is impaired.

In a helicopter other than a multicopter, to configure a variable pitch mechanism with a small number of members while suppressing the influence of the "deflection" which occurs in a link mechanism is desirable in order to enhance control precision of a pitch angle, and improve flying stability.

The present invention has been made in view of such a problem which a conventional technology has, and an object of the present invention is to configure a simple variable pitch mechanism for a helicopter including a multicopter with a small number of members, and to enable accurate control of the pitch angle of blades without accurate adjustment to stable flying operation.

Solution to Problem

In order to solve the above problem, the present invention is to propose a helicopter rotor head for changing a pitch angle of blades of a rotor head mounted on a main mast to fly, wherein blade holders that hold the blades are mounted on right and left sides of a yoke fixed to the main mast, a pitch plate unit is slidably mounted on an outer periphery of the main mast along an outer peripheral surface of the main mast, and the pitch plate unit and the blade holders are connected through pitch links, a pitch lever is supported on a lateral side of the main mast so as to be rotatable around an axial direction orthogonal to the main mast, a pair of arm sections protruding from both ends of an outer peripheral surface are mounted so as to face right and left sides of the main mast, and an output shaft of a servomotor is directly connected to a rotary shaft of the pitch lever, and when the servomotor is actuated, and the pitch lever directly connected to the output shaft of the servomotor is rotated, the pitch plate unit moves upward or downward along the main mast in conjunction with rotational displacement of the arm sections of the pitch lever on the right and left sides of the main mast, and the blade holders are provided so as to tilt with the upward or downward movement to change the pitch angle of the blades.

The pair of arm sections of the pitch lever that face the right and left sides of the main mast may be installed so as to support a lower section of the pitch plate unit, and may be provided such that the pitch plate unit moves upward or downward along the main mast in conjunction with rotational displacement of the arm sections. Additionally, the pitch plate unit may have an upper and lower divided structure, an upper section may formed so as to rotate integrally with the blade holders, the arm sections of the pitch lever may be pivotably supported and fastened on an outer periphery of a lower section, and may be provided such that rotation movement of the pitch lever is converted to vertical movement of the pitch plate unit.

For example, in the rotor head having the above configuration, the pitch plate unit can be composed of a pitch plate formed by protruding arm sections on an outer peripheral surface of a ring-shaped main body section, and a cylindrical pitch plate boss, the pitch plate can be rotatably supported by a neck section protruding from an upper surface of the pitch plate boss, both the arm sections of the pitch plate are connected to the pitch arms provided in the blade holders through the pitch links, and the arm sections of the pitch lever can be rotatably and pivotably supported and connected to an outer peripheral surface of the pitch plate boss.

The rotor head having the above configuration is applicable to a multicopter rotor head. Additionally, the rotor head having the above configuration is applicable to a helicopter for flying in an unmanned manner or a manned manner by remote control or autonomous control.

According to the present invention, rotational displacement of the output shaft at the time of activation of the servomotor is transmitted to the pitch plate unit from the arm sections of the pitch lever that rotates integrally with the output shaft, the rotation movement is converted to upward or downward movement of the pitch plate unit along the main mast, and the blade holders tilt in conjunction with the upward or downward displacement of the pitch plate unit, so that it is possible to change the pitch angle of the blades.

In a case where the pitch plate unit is composed of the pitch plate boss and the pitch plate, the rotational displacement of the servomotor is transmitted from the pitch lever to the pitch plate boss, and is converted such that the pitch plate boss and the pitch plate are vertically displaced, the blade holders tilt in conjunction with the upward or downward displacement of the pitch plate, so that the pitch angle of the blades is changed.

In the present invention, the arm sections of the pitch lever directly connected to the output shaft of the servomotor rotates in conjunction with the rotation of the servomotor on both sides of the main mast, the rotational displacement is converted to vertical movement of the pitch plate unit along the main mast. As the pitch angle of the blades changes in response to vertical movement of the pitch plate unit, the number of members configuring the variable pitch mechanism can be reduced, the configuration can be simple, the weight of the airframe can be reduced. The number of connecting portions of the members is small, and therefore influence of "deflection" that occurs in a link mechanism is suppressed, and it is possible to stabilize flying operation by precisely controlling the pitch angle even without accurate adjustment.

In a case where the present invention is applied to a multicopter, a variable pitch is used, so that the multicopter becomes strong against disturbance such as strong wind, and flying operation is stabilized. Even when the attitude of the airframe is collapsed during flying, it is possible to return even from any attitude, and it is possible to prevent occurrence of an accident such as collapse of the flight attitude during downward movement, and falling. Additionally, it is possible to stably move downward even in an updraft, and it is possible to improve reliability as an industrial apparatus in the field of collecting ground information from the sky.

The pitch angle can be suitably controlled, and therefore an upper section of the airframe is directed downward, that is, flying in a state where the airframe is vertically reversed is possible, for example, a payload such as a camera is loaded on the upper side of the airframe, and the airframe is reversed in the sky, so that photographing while the camera is directed downward is possible. In this case, convenience such as installation work or maintenance of the camera is improved.

DESCRIPTION OF EMBODIMENTS

A preferred embodiment of the present invention will be described with reference to the drawings.

Figure 1:
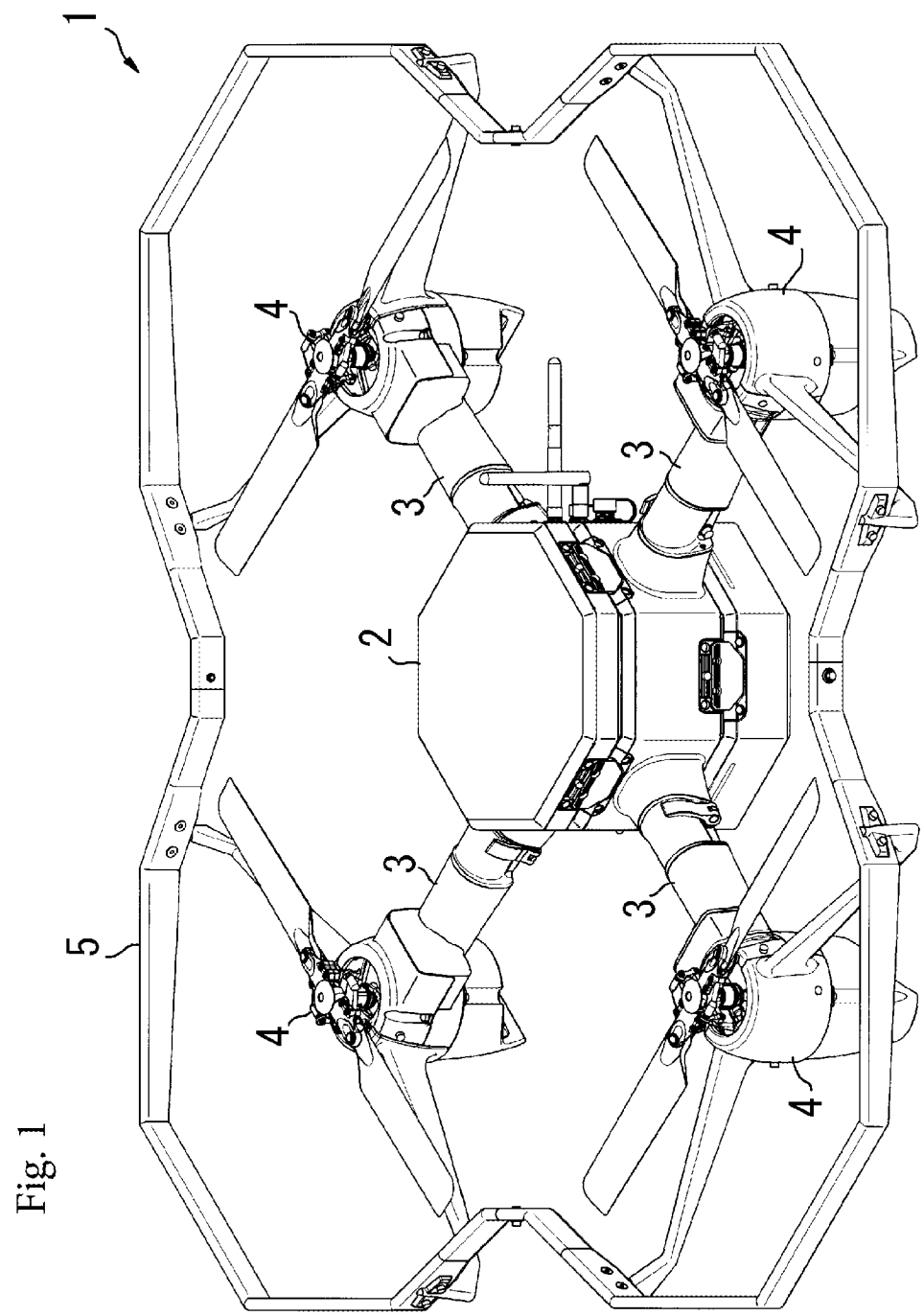
FIG. 1 is an external view of an embodiment of a multicopter equipped with a rotor head of the present invention.

FIG. 1 illustrates a multicopter of an embodiment equipped with a rotor head of the present invention, this multicopter 1 supports driving units 4 composed of electric motors 6 and rotor head units 7 at leading ends of four arm sections 3 that protrude in a cross shape in plan view on a peripheral side surface of a body section 2, and flies in the sky by controlling the rotational speed and the pitch angle of the blades 14 of each of the rotor head units 7 by remote control. Reference numeral 5 denotes a guard frame integrally mounted on covers of arm sections 3 so as to surround a periphery of each arm section 3.

The body section 2 is equipped with members such as a receiver, a flight controller, a battery, and an attitude sensor, and is provided such that the receiver receives a maneuvering signal emitted from a transmitter, the received signal and a sensor signal are processed, and driving signals are supplied to electric motors 6 provided in the respective arm sections 3, and servomotors 19 described below.

Each of the driving units 4 provided at the respective leading ends of the arm sections 3 is composed of the electric motor 6 installed such that an output shaft serving as a main mast 61 is directed upward, and the rotor head unit 7 provided around the main mast 61. On an upper surface of the electric motor 6, a pitch lever 18 describe below, and a servo mount plate 8 that supports the servomotor 19 are mounted.

The rotor head unit 7 is composed of a rotor head 9 that supports blades 14 at an upper end of the main mast 61, and a variable pitch mechanism 15 that changes the pitch angle of the blades 14.

Figure 4:
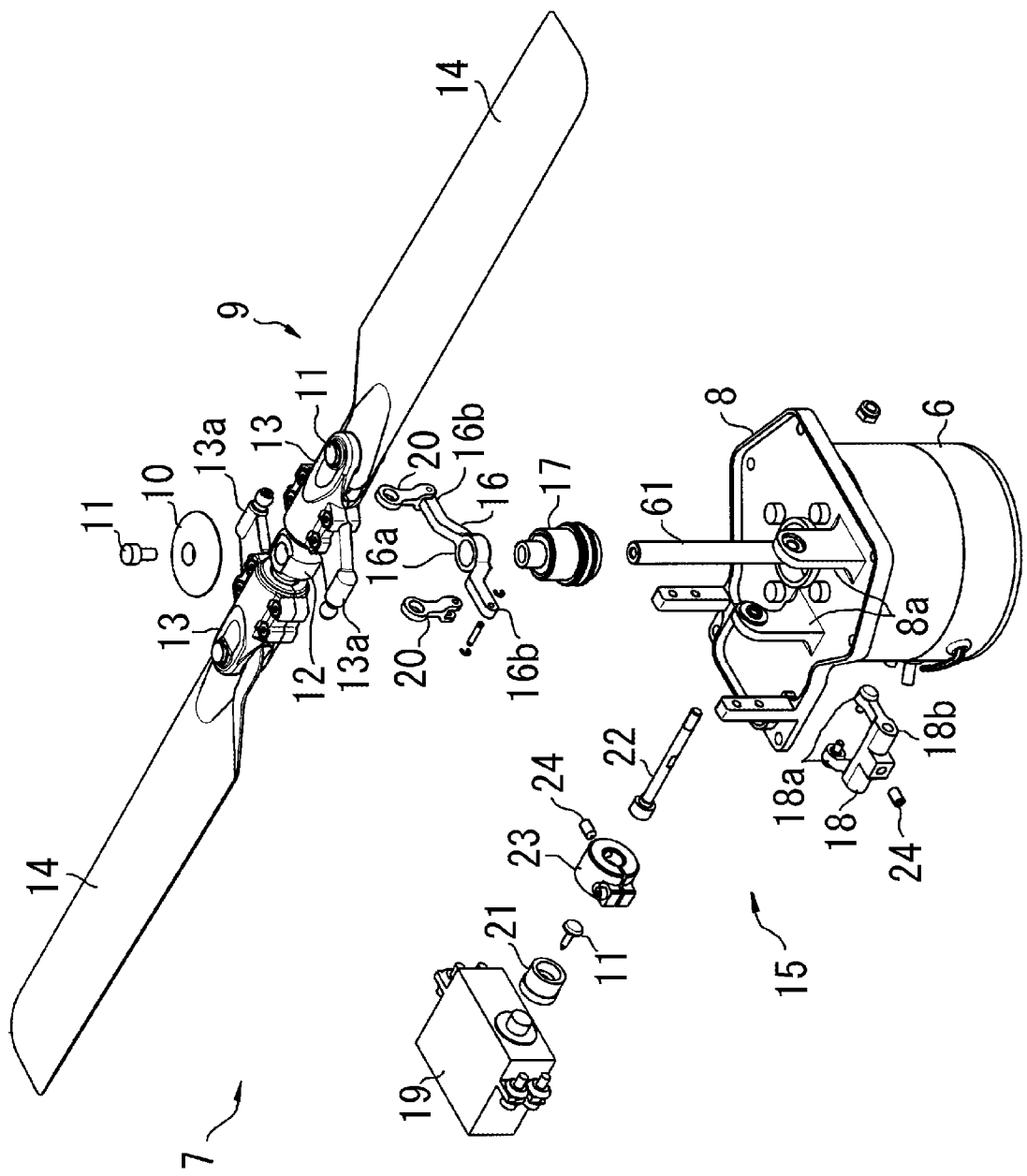
FIG. 4 is an external view of the driving unit whose constituent members are developed.

As illustrated in FIG. 4, the rotor head 9 is composed of a yoke 12 fitted to an outer periphery of the upper end of the main mast 61, and integrally fixed to the main mast 61 by a bolt 11 through a dome 10, a pair of blade holders 13, 13 rotatably mounted on the right and left sides of the yoke 12 around the axial direction orthogonal to the main mast 61, and blades 14, 14 integrally fastened to ends of both the blade holders 13, 13 by bolts 11.

The variable pitch mechanism 15 is composed of a pitch plate 16 and a pitch plate boss 17 slidably mounted at upper and lower sections on an outer periphery of the main mast 61 along an outer peripheral surface of the main mast 61, and respective members of the pitch lever 18 and the servomotor 19 mounted on the servo mount plate 8.

More specifically, the pitch plate 16 is formed in such a shape that arm sections 16*b*, 16*b* protrude on an outer peripheral surface of a ring-shaped main body section 16*a* having a hole section, the inner diameter of which is slightly larger than the outer diameter of the main mast 61, and a second ends of pitch links 20, 20 having first ends rotatably and pivotably supported and connected to pitch arms 13*a* in the blade holders 13, 13 are pivotably supported by both the arm sections 16*b*, 16*b* and connected to the blade holders 13, and is mounted so as to rotate integrally with the rotor head 9.

The pitch plate boss 17 is a cylindrical member that is mounted on the lower side of the pitch plate 16 on an outer periphery of the main mast 61, and has an inner diameter slightly larger than the outer diameter of the main mast 61, and is mounted on the pitch plate 16 so as to rotatably support the pitch plate 16 by fitting the pitch plate 16 to a neck section protruding from an upper end of the pitch plate boss. Arm sections 18*a*, 18*a* of the pitch lever 18 described below are rotatably and pivotably supported to be connected on the right and left sides of the pitch plate boss 17, and can perform vertical sliding displacement along the outer peripheral surface of the main mast 61 with displacement of both the arm sections 18*a*, 18*a*.

The pitch lever 18 allows a shaft 22 fixed to an output shaft of the servomotor 19 to pass in a hole section 18*b* and is directly connected to the shaft 22, and is mounted so as to rotate integrally with the output shaft of the servomotor 19 around the axial direction orthogonal to the main mast 61 between seat sections 8*a*, 8*a* provided on an upper surface of the servo mount plate 8 on the lateral sides of the main mast 61. Additionally, the arm sections 18*a*, 18*a* protrude in the direction orthogonal to the axial direction of the pitch lever 18 on outer peripheral surfaces of both ends along the axial direction of the pitch lever 18, arm sections 18, 18*a* are disposed on the right and left sides of the main mast 61 so as to face each other in a state where the pitch lever 18 is supported between the seat sections 8*a*, 8*a*, and as described above, the arm sections 18*a*, 18*a* are rotatably and pivotably supported and connected on the right and left sides of the pitch plate boss 17.

The servomotor 19 has the output shaft coupled to an adjusting horn 21, the shaft 22, and an adjusting clamp 23, and is mounted on the servo mount plate 8 by allowing the shaft 22 to pass through the hole section 18*b* of the pitch lever 18 disposed between the seat sections 8*a*, 8*a*, and integrally fixing the pitch lever 18 to an outer peripheral surface of the shaft 22 by a set screw 24. Bearings are mounted on inner peripheries of the hole sections of the seat sections 8*a*, 8*a* penetrated by the shaft 22.

The rotor head unit 7 having such a configuration causes the servomotor 19 to actuate to rotate the pitch lever 18 directly connected to the output shaft, so that the pitch plate boss 17 and the pitch plate 16 supported by the upper end of the pitch plate boss 17 are displaced upward or downward along the main mast 61, blade holders 13, 13 connected to the pitch plate 16 tilt with this, and the pitch angle of the blades 14, 14 can be changed.

That is, rotational displacement of the output shaft at the time of the actuation of the servomotors 19 is converted to upward or downward displacement of the pitch plate boss 17 and the pitch plate 16 along the main mast 61 in the process of transmission from the pitch lever 18 rotating integrally with the output shaft to the pitch plate boss 17, the blade holders 13, 13 connected to the pitch plate 16 through the pitch links 20, 20 tilt around the axial direction orthogonal to the main mast 61 on the lateral sides of the yoke 12 in conjunction with the upward or downward displacement of the pitch plate 16, and the pitch angle of the blades 14, 14 is changed.

Figure 2:
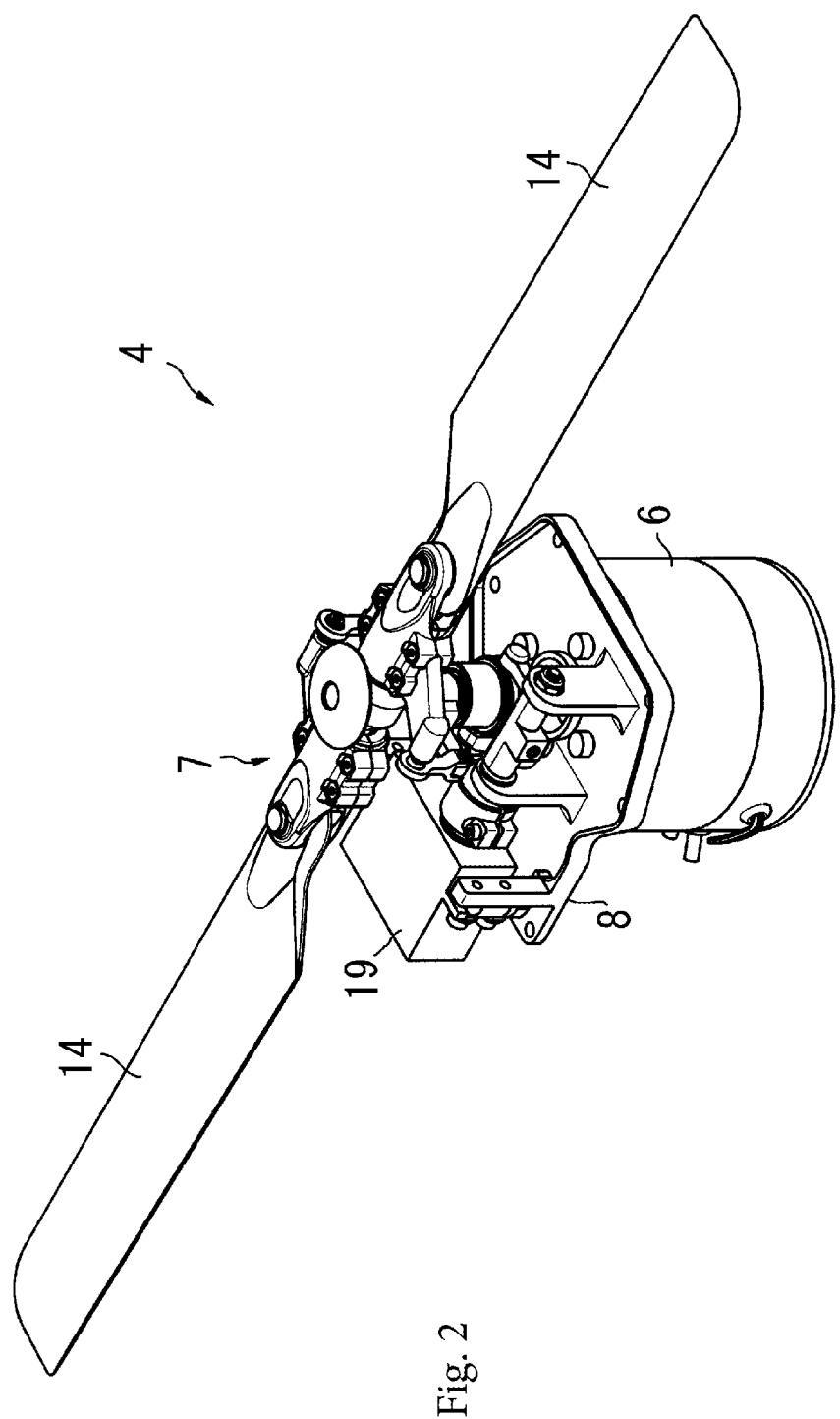
FIG. 2 is an external view of a driving unit supported by arm sections of the multicopter of FIG. 1.
Figure 3:
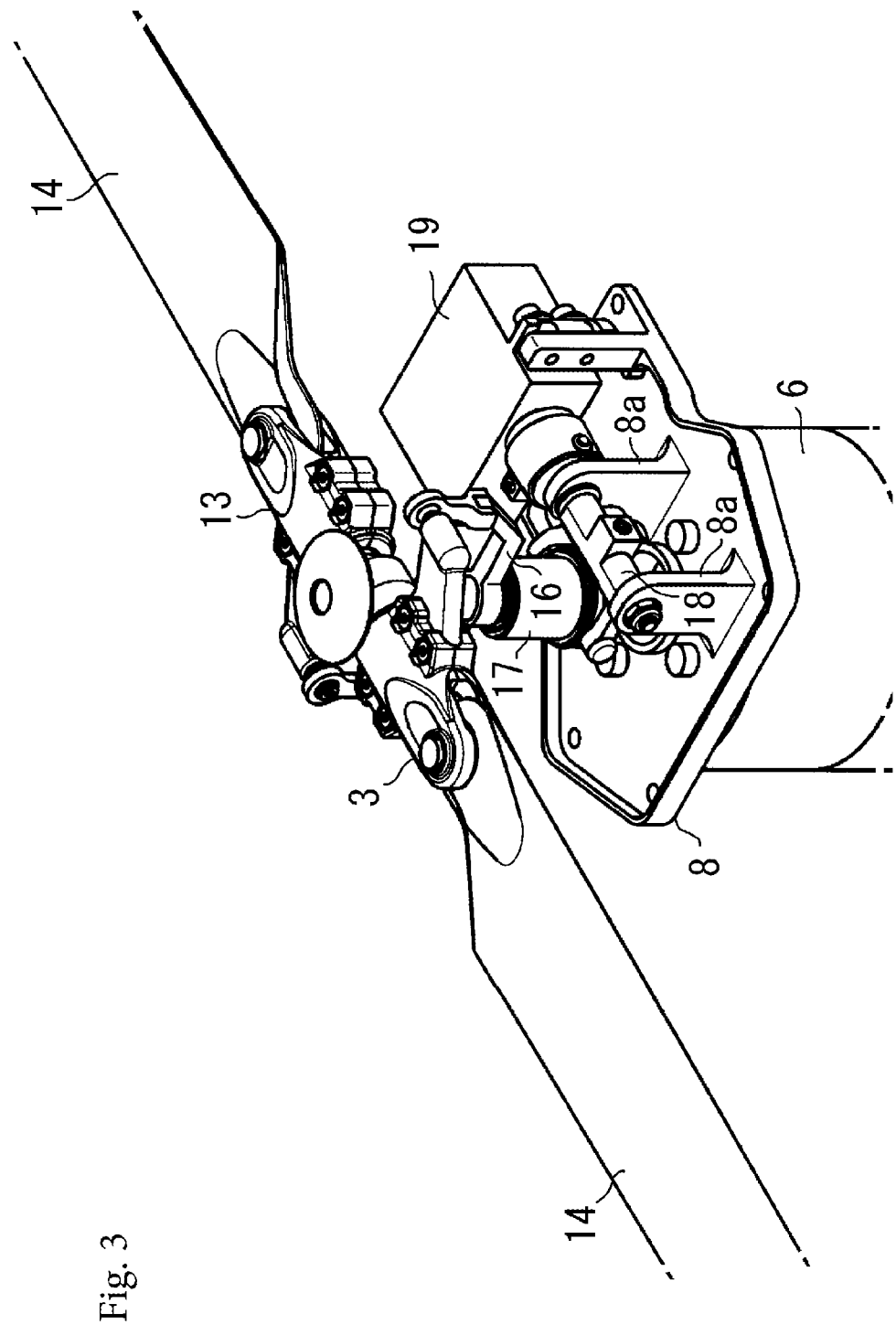
FIG. 3 is an external view of the driving unit, the direction of which is different from the direction of the driving unit of FIG. 2.
Figure 5:
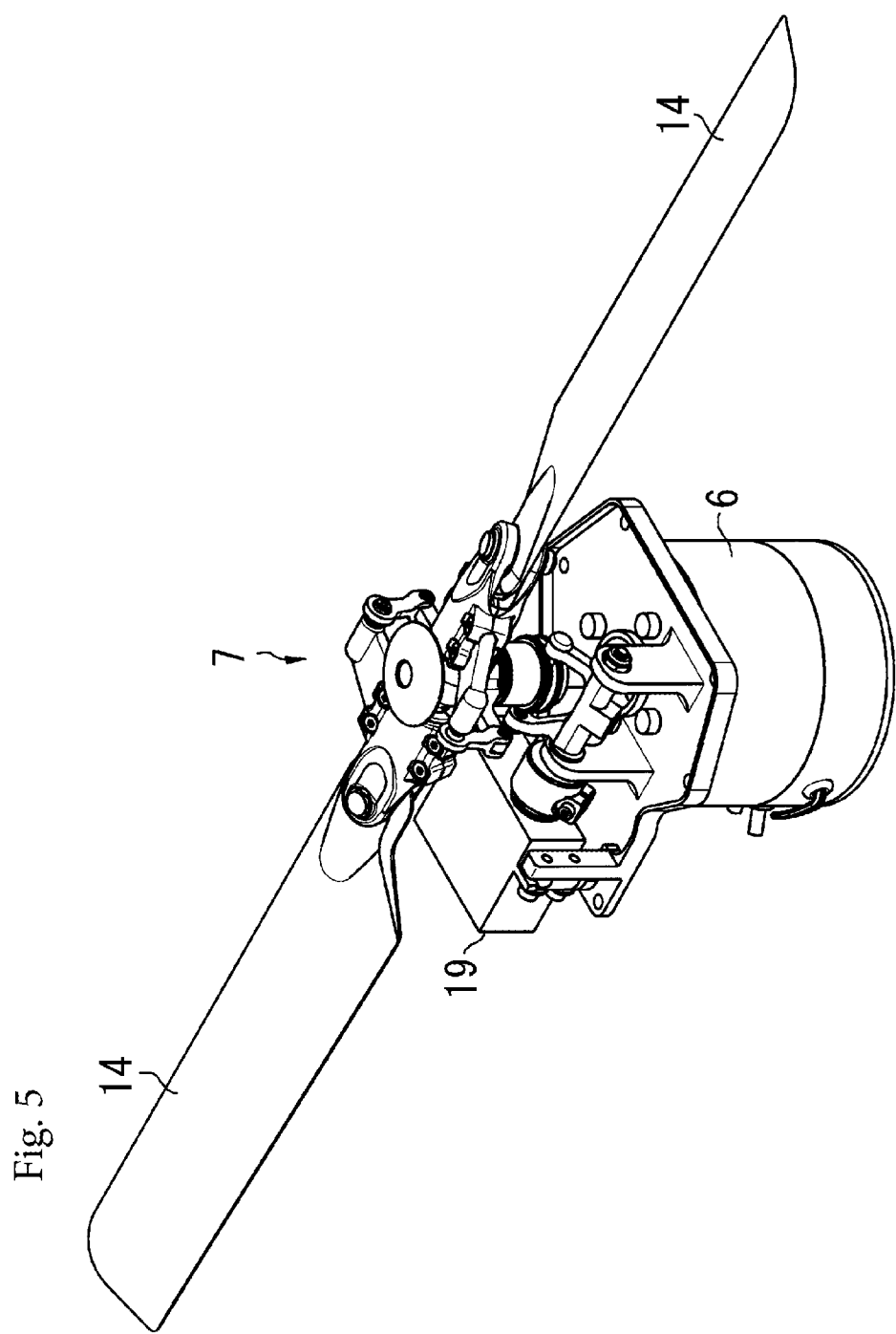
FIG. 5 is an external view of the driving unit when the pitch angle of blades is changed to the plus direction from the state illustrated in FIG. 2.
Figure 6:
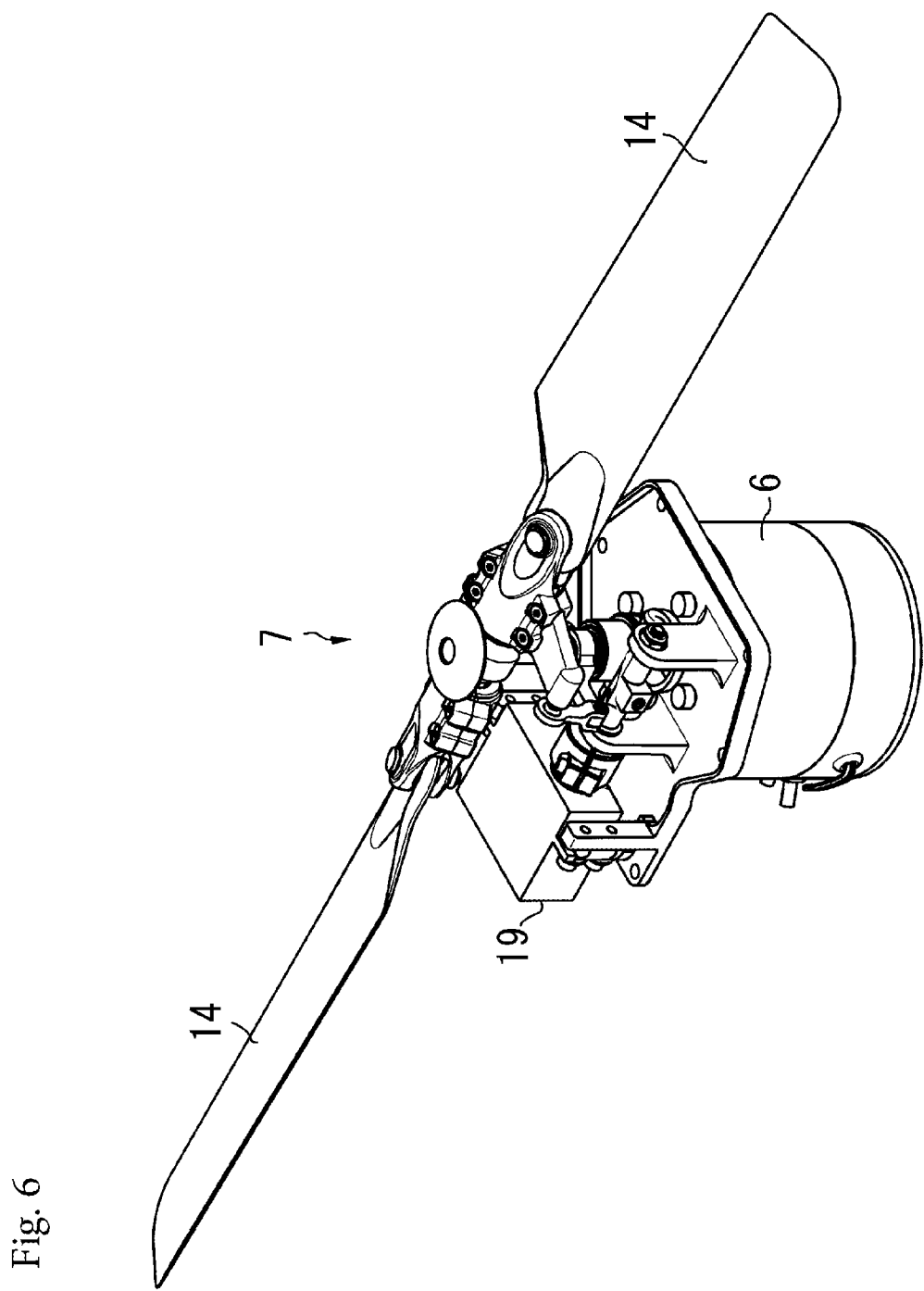
FIG. 6 is an external view of the driving unit when the pitch angle of blades is changed to the minus direction from the state illustrated in FIG. 2.

FIG. 5 illustrates a state in which the servomotors 19 is actuated, the pitch plate boss 17 and the pitch plate 16 are moved upward along the main mast 61 from the state illustrated in FIG. 2 in which the pitch angle of the blades 14, 14 is neutral, and the pitch angle of the blades 14, 14 is changed in the plus direction. On the contrary, FIG. 6 illustrates a state in which the pitch plate boss 17 and the pitch plate 16 are moved downward along the main mast 61, and the pitch angle of the blades 14, 14 is changed in the minus direction.

Thus, the arm sections 18*a*, 18*a* of the pitch lever 18 directly connected to the output shaft of the servomotor 19 rotates on the both sides of the main mast 61 in conjunction with the rotation of the servomotor 19, and are provided such that the rotational displacement is converted to movement for moving the pitch plate boss 17 and the pitch plate 16 upward or downward along the main mast 61, and the pitch angle of the blades 14 is changed, so that the number of members configuring the variable pitch mechanism is reduced, the configuration is simple, the weight of the airframe is reduced, and it is possible to stabilize flying operation by precisely controlling the pitch angle while suppressing influence of "deflection" that occurs in a link mechanism.

According to the multicopter 1 of this embodiment, the pitch angle of the blades 14, 14 can be controlled to a suitable angle, and therefore the multicopter becomes strong against disturbance such as strong wind, flying operation is stable. Even when the attitude of the airframe is collapsed during flying, it is possible to return even from any attitude. Additionally, it is possible to stably move downward even in an updraft, and it is possible to improve reliability as an industrial apparatus.

The illustrative embodiment is an example, and when the multicopter of the present invention is equipped with three or more rotors, the multicopter of the present invention can be configured in another suitable mode by suitably setting arrangement of rotors. In this embodiment, the quad-copter including four blades is exemplified as the multicopter. However, the present invention is also applicable to a hexa-copter including six blades, or an octa-copter including eight blades.

The pitch plate 16 and the pitch plate boss 17 may be integrally provided. That is, a pair of the arm sections 18*a*, 18*a* of the pitch lever 18, which face the right and left sides of the main mast 61, may be installed so as to support a lower section of a pitch plate unit provided with the pitch plate 16 and the pitch plate boss 17 integrally, the pitch plate unit may be provided so as to move upward or downward along the main mast 61 in conjunction with rotational displacement of the arm sections 18*a*, 18*a*.

Furthermore, the present invention is also applicable to a helicopter other than a multicopter, such as a single helicopter, as well as to an unmanned helicopter that flies by remote control or autonomous control, or a manned helicopter.

REFERENCE SIGNS LIST 1 multicopter
2 body section 3 arm sections
4 driving unit
5 guard frame
6 electric motor
61 main mast
7 rotor head unit
8 servo mount plate
9 rotor head
10 dome
11 bolt
12 yoke
13 blade holder
14 blade
15 variable pitch mechanism
16 pitch plate
17 pitch plate boss
18 pitch lever
19 servomotor
20 pitch link
21 adjusting horn
22 shaft
23 adjusting clamp
24 set screw

The invention claimed is:

1. A helicopter rotor head for changing a pitch angle of blades of a rotor head mounted on a main mast to fly, wherein
blade holders that hold the blades are mounted on right and left sides of a yoke fixed to the main mast,
a pitch plate unit is slidably mounted on an outer periphery of the main mast along an outer peripheral surface of the main mast, and the pitch plate unit and the blade holders are connected through pitch links,
a pitch lever is supported on a lateral side of the main mast so as to be rotatable around an axial direction orthogonal to the main mast, a pair of arm sections protruding from an outer peripheral surface are mounted so as to face right and left sides of the main mast, and an output shaft of a servomotor is directly connected to a rotary shaft of the pitch lever, and
when the servomotor is actuated, and the pitch lever directly connected to the output shaft of the servomotor is rotated, the pitch plate unit moves upward or downward along the main mast in conjunction with rotational displacement of the arm sections of the pitch lever on the right and left sides of the main mast, and the blade holders are provided so as to tilt to change the pitch angle of the blades.

2. The helicopter rotor head according to claim 1, wherein the pitch plate unit is composed of a pitch plate formed by protruding arm sections on an outer peripheral surface of a ring-shaped main body section, and a cylindrical pitch plate boss, the pitch plate is rotatably supported by a neck section protruding from an upper surface of the pitch plate boss, both the arm sections of the pitch plate are connected to pitch arms provided in the blade holders through the pitch links, and the arm sections of the pitch lever are rotatably and pivotably supported and connected to an outer peripheral surface of the pitch plate boss.

3. A multirotor helicopter comprising the rotor head according to claim 2.

4. A helicopter for flying in an unmanned manner or a manned manner by remote control or autonomous control, the helicopter comprising the rotor head according to claim 2.

5. A multirotor helicopter comprising the rotor head according to claim 1.

6. A helicopter for flying in an unmanned manner or a manned manner by remote control or autonomous control, the helicopter comprising the rotor head according to claim 1.

* * * * *